G. BARON.
BOLT LOCK.
APPLICATION FILED DEC. 4, 1920.
1,391,447.
Patented Sept. 20, 1921.
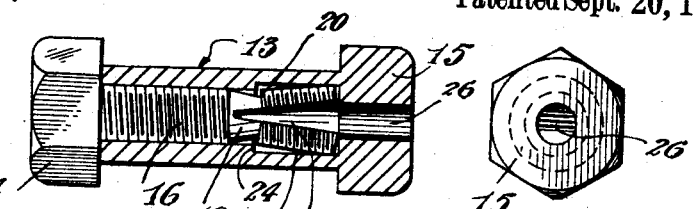
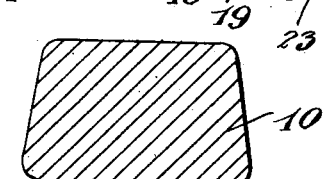
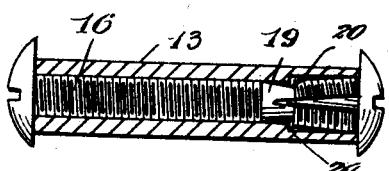
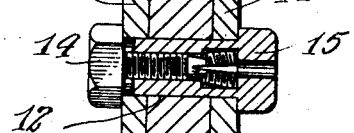
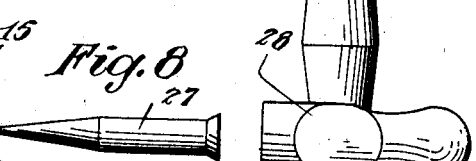
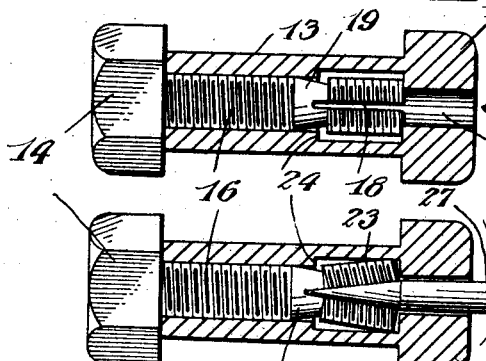
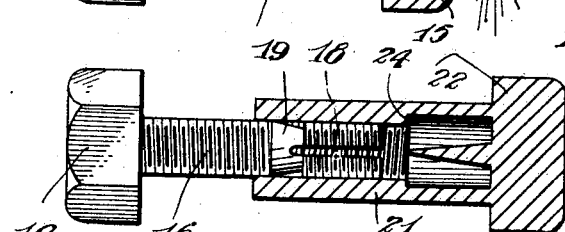
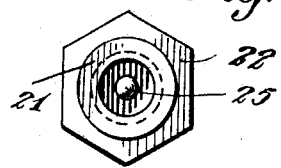
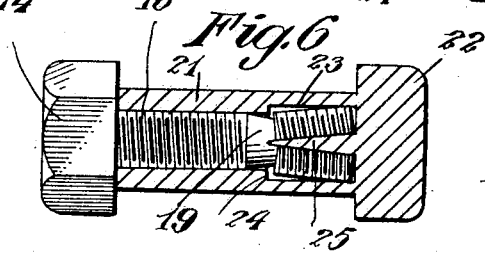
Inventor:
George Baron
By William Clinton
Attorney

UNITED STATES PATENT OFFICE.

GEORGE BARON, OF MONTREAL, QUEBEC, CANADA.

BOLT-LOCK.

1,391,447.  Specification of Letters Patent.  Patented Sept. 20, 1921.

Application filed December 4, 1920. Serial No. 428,321.

*To all whom it may concern:*

Be it known that I, GEORGE BARON, a subject of the King of Great Britain, residing at Montreal, Province of Quebec, Canada, have invented certain new and useful Improvements in Bolt-Locks; and I do hereby declare that the following is a full, clear, and exact description of the invention, such as will enable others skilled in the art to which it appertains to make and use the same.

The present invention relates to new and useful improvements in bolt locks.

The primary object of the invention is the provision of a bolt including two telescoping threaded sections and means for locking said sections against separation.

Another object of the invention is the provision of a bolt lock including a bolt having a split end therefor, and a lock for said bolt comprising a sleeve threaded thereon, and means for extending the bolt into engagement with the sides of the sleeve for preventing the removal of the sleeve from the bolt.

A further object of the invention is the provision of a bolt which is threaded and provided with a split end, together with means for forcing said split end into engagement with an enlargement provided in the sleeve which is designed to be threaded upon said bolt for preventing the separation of the several parts.

A still further object of the invention is the provision of a bolt and a locking means therefor, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings forming a part of the present application, and in which:—

Figure 1 is a transverse sectional view taken through a railway rail showing the invention applied thereto;

Fig. 2 is an enlarged longitudinal sectional view taken through the bolt removed;

Fig. 3 is is an end view;

Fig. 4 is a view similar to Fig. 2 but showing a modified form of bolt;

Fig. 5 is a longitudinal view showing sections of the bolt constructed in accordance with Fig. 4 partly separated;

Fig. 6 is a view showing the same form with the sections locked together;

Fig. 7 is a view looking at the end of the outer section of said bolt;

Fig. 8 is a view corresponding to Fig. 2 before the end of the bolt is spread; and, Fig. 9 is a corresponding view showing the manner of spreading the end of said bolt.

Referring now to the accompanying drawings by corresponding characters of reference throughout the several views, the numeral 10 designates in general a portion of a railway rail shown in cross section, and having the usual connecting plates 11 in engagement with the opposite sides thereof, the said rail and plates being provided with the customary alining openings 12.

My improved bolt is shown at 13 and comprises a pair of sections 14 and 15, the former of which comprises the usual threaded shank 16 provided at one end with a head 17 and having its opposite end split as shown at 18. The bolt at the inner end of the split portion 18 is reduced as shown at 19 providing shoulders 20 for a purpose to be later explained.

The section 15 comprises an internal threaded sleeve 21 provided for engagement with the threaded shank 16 of the bolt.

A head 22 is provided upon one end of the sleeve 21, while the interior of said sleeve adjacent the head 22 is enlarged as at 23 forming shoulders 24 for interlocking engagement with the shoulders 20 formed on gagement with the shoulders 20 formed on the shank 16 when the end of said shank has been spread as shown clearly in Fig. 6.

Any desired form of means may be employed for spreading the end of the shank 16, such as, for instance, the tapered pin 25 which is carried by the head 22 and extends inwardly concentric of the sleeve 21, as shown in Figs. 5 and 6.

Obviously, as the section 14 is threaded into the sleeve 21, when the split end of the shank engages the pin 25, the latter will pass into the split portion 18 spreading the ends of said bolt until the shoulders 20 become engaged in the rear of the shoulders 24 which obviously prevents the sections 14 and 15 from becoming separated.

Another form of spreading the split end 18 of the said shank is to provide an opening 26 centrally of the head 22 and extend entirely therethrough in registration with the split portion 18 of the bolt. A suitable cold chisel such as shown at 27, or other desired instrument, may be inserted through the opening 26 into engagement with the split portion 18 of the bolt, and by striking this instrument a sharp blow with a hammer or the like, shown at 28, the end of the bolt will be expanded forcing the shoulders 20 into engagement with the shoulders 24 and thus preventing the separation of the several sections.

From the foregoing description taken in connection with the accompanying drawings, it will be manifest that a bolt and a locking means therefor is provided which will fulfil all of the necessary requirements of such a device, and while in the drawings for the purposes of illustration the same is shown in connection with a railway rail, it is to be understood that I am not to be limited to such use of the bolt but may employ the same for any other purpose to which the various parts thereof will adapt themselves, and it should be further understood in this connection, that various minor changes in the specific details of construction can be resorted to within the scope of the appended claim, without departing from the spirit or sacrificing any of the advantages of the invention.

Having thus fully described the invention, what I claim as new and desire to secure by Letters Patent is:—

The combination with a bolt including a head and a threaded shank, said shank being split at the end thereof, said bolt being reduced to weaken the same at the inner end of said split portion, and to form oppositely disposed shoulders, a sleeve threaded upon said bolt, a head provided upon said sleeve, said sleeve being enlarged adjacent the head forming shoulders, and means for spreading the end of the bolt at the weakened portion when the latter is threaded within the sleeve for forcing the shoulders of the bolt behind the shoulders of the sleeve, as and for the purposes set forth.

In witness whereof I have hereunto set my hand.

GEORGE BARON.